US008369386B2

(12) United States Patent
Takahashi et al.

(10) Patent No.: US 8,369,386 B2
(45) Date of Patent: Feb. 5, 2013

(54) RECEIVER, SIGNAL PROCESSING METHOD AND PROGRAM

(75) Inventors: Hideki Takahashi, Kanagawa (JP); Katsuyuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 12/816,707

(22) Filed: Jun. 16, 2010

(65) Prior Publication Data

US 2011/0007782 A1 Jan. 13, 2011

(30) Foreign Application Priority Data

Jul. 13, 2009 (JP) ................................. 2009-164691

(51) Int. Cl.
*H04B 1/00* (2006.01)

(52) U.S. Cl. ........ 375/149; 375/145; 375/316; 375/324; 375/340; 375/342; 375/350; 375/354; 375/365; 375/366; 375/368; 455/323; 455/334; 455/502; 370/503; 370/508; 370/509; 370/510; 370/511; 370/512; 370/513; 370/514; 327/141; 329/361

(58) Field of Classification Search .................. 375/145, 375/149, 316, 324, 340, 342, 350, 354, 365, 375/366, 368; 455/323, 334, 502; 370/503, 370/508, 509, 510, 511, 512, 513, 514; 327/141; 329/361

See application file for complete search history.

(56) References Cited

U.S. PATENT DOCUMENTS

2003/0219082 A1* 11/2003 Tanaka et al. ................. 375/324
2007/0098118 A1* 5/2007 Muhammad et al. ......... 375/344
2007/0287402 A1* 12/2007 Feng et al. .................... 455/323

FOREIGN PATENT DOCUMENTS

JP 2003-232844 8/2003

* cited by examiner

*Primary Examiner* — Leon Flores
(74) *Attorney, Agent, or Firm* — Oblon, Spivak, McClelland, Maier & Neustadt, L.L.P.

(57) ABSTRACT

A receiver includes a receiving unit that receives a signal from a satellite, a frequency conversion-discretization unit that converts the signal received in the receiving unit into an intermediate frequency signal of a frequency bandwidth including 0 Hz, and discretizes the frequency-converted intermediate frequency signal with a predetermined sampling frequency, a filter unit that filters the discretized signal, which is output from the frequency conversion-discretization unit, through a predetermined filter, a synchronization acquisition unit that acquires synchronization of a spreading code in the discretized signal filtered by the filter unit, and a synchronization holding unit that holds the synchronization of the spreading code, which is acquired by the synchronization acquisition unit.

11 Claims, 18 Drawing Sheets

RECEIVER, SIGNAL PROCESSING METHOD AND PROGRAM

BACKGROUND OF THE INVENTION

1. Technical Field

The invention relates to a receiver, a signal processing method and a program.

2. Description of the Related Art

Recently, various electronic apparatuses, such as car navigation apparatuses, cell phones and digital still cameras, are provided with a positioning function using a GPS (Global Positioning System). Typically, when an electronic apparatus uses a GPS, a GPS module receives a signal from four or more GPS satellites to measure the position of the apparatus based on the received signal, and the measurement result is notified to users through the screen or the like of a display apparatus. In more detail, the GPS module demodulates the received signal to acquire orbital data of each GPS satellite, and derives the three-dimensional position of the apparatus from the orbital data, time information and delay time of the received signal by using a simultaneous equation. The reason that four or more GPS satellites, from which the signal is transmitted, are necessary is for eliminating the influence of an error between internal time of the module and time of the satellites.

Herein, the signal (L1 band, C/A codes) transmitted from the GPS satellites is obtained by BPSK (Binary Phase Shift Keying)-modulating a spectrum spread signal, which is obtained by spectrum-spreading data of 50 bps by using Gold codes. The Gold code is a kind of a pseudo-random code with a code length of 1023 and a chip rate of 1.023 MHz. Further, for the BPSK modulation, a carrier of 1575.42 MHz is used. Thus, when the GPS module receives the signal from the GPS satellites, it is necessary to synchronize the spreading code, the carrier and the data.

In general, a GPS module mounted on an electronic apparatus frequency-converts a carrier frequency of a received signal into an IF (Intermediate Frequency) of several MHz or less, and then performs the above-described synchronization process and the like (for example, refer to Japanese Unexamined Patent Application Publication No. 2003-232844). A typical IF, for example, is 4.092 MHz, 1.023 MHz, 0 Hz or the like. Normally, a received signal has a signal strength smaller than signal strength of a thermal noise, and a S/N less than 0 dB. However, the signal can be demodulated by a spread spectrum process gain. In the case of a GPS signal, for example, a process gain with respect to a data length of 1 bit is 10 Log(1.023 MHz/50)≈43 dB.

SUMMARY OF THE INVENTION

However, the market of the electronic apparatus provided with the GPS module has been more and more extensive. In terms of performance, with the improvement of receiver sensitivity, a GPS module with receiver sensitivity of −150 dBm to −160 dBm has been extensively used.

In addition to the extensive use of the GPS module, high performance of an electronic apparatus provided with the GPS module is also achieved. Moreover, as the electronic apparatus provided with the GPS module is manufactured in a smaller size, there has been increasing demand for reduction in the circuit size of the GPS module.

As described above, when the GPS module receives a signal from the GPS satellites, since it is necessary to synchronize the spreading code, the carrier and the data, a circuit for performing the synchronization process is provided. The circuit is necessary to be provided for each GPS satellite, resulting in an increase in the circuit size of the GPS module.

In view of the above issues, it is desirable to provide a novel and modified receiver having a reduced circuit size of a GPS module, a signal processing method and a program.

According to one embodiment of the invention, there is provided a receiver including a receiving unit that receives a signal from a satellite, a frequency conversion-discretization unit that converts the signal received in the receiving unit into an intermediate frequency signal of a frequency bandwidth including 0 Hz, and discretizes the frequency-converted intermediate frequency signal with a predetermined sampling frequency, a filter unit that filters the discretized signal, which is output from the frequency conversion-discretization unit, through a predetermined filter, a synchronization acquisition unit that acquires synchronization of a spreading code in the discretized signal filtered by the filter unit, and a synchronization holding unit that holds the synchronization of the spreading code, which is acquired by the synchronization acquisition unit.

With such a configuration, the circuit size of the GPS module can be reduced.

Further, the frequency conversion-discretization unit may include a first frequency converting section that converts the signal received in the receiving unit into the predetermined intermediate frequency signal, a discretizing section that discretizes the intermediate frequency signal, which is frequency-converted by the first frequency converting unit, with the predetermined sampling frequency, and a second frequency converting section that converts the discretized signal, which is output from the discretizing section, into a discretized signal serving as an intermediate frequency signal of a frequency bandwidth including 0 Hz.

Further, the synchronization acquisition unit may acquire the synchronization of the spreading code by down-sampling the discretized signal, which is filtered by the filter unit, with a frequency lower than the predetermined sampling frequency, and the synchronization holding unit may hold the synchronization of the spreading code, which is acquired by the synchronization acquisition unit, by down-sampling the discretized signal, which is filtered by the filter unit, with the frequency lower than the predetermined sampling frequency.

Further, the synchronization acquisition unit and the synchronization holding unit may down-sample the discretized signal by selectively using a multi-phase clock.

Further, the receiver may further include a reduction unit that reduces the number of bits of the discretized signal output from the filter unit.

Further, the predetermined filter may be a moving average filter that performs a moving average with respect to the discretized signal by one chip of the spreading code.

Further, the predetermined filter may be a FIR (Finite Impulse Response) filter or an IIR (Infinite Impulse Response) filter.

According to another embodiment of the invention, there is provided a signal processing method including the steps of receiving a signal from a satellite, converting the received signal into an intermediate frequency signal of a frequency bandwidth including 0 Hz, and discretizing the frequency-converted intermediate frequency signal with a predetermined sampling frequency, filtering the discretized signal through a predetermined filter, acquiring synchronization of a spreading code in the filtered discretized signal, and holding the acquired synchronization of the spreading code.

The circuit size of the GPS module can be reduced using the method.

According to further another embodiment of the invention, there is provided a program that causes a computer to execute functions of receiving a signal from a satellite, converting the received signal into an intermediate frequency signal of a frequency bandwidth including 0 Hz, and discretizing the frequency-converted intermediate frequency signal with a predetermined sampling frequency, filtering the discretized signal through a predetermined filter, acquiring synchronization of a spreading code in the filtered discretized signal, and holding the acquired synchronization of the spreading code.

The circuit size of the GPS module can be reduced using the program.

According to the embodiment of the invention as described above, the circuit size of the GPS module can be reduced.

DESCRIPTION OF THE PREFERRED EMBODIMENTS

Figure 1:
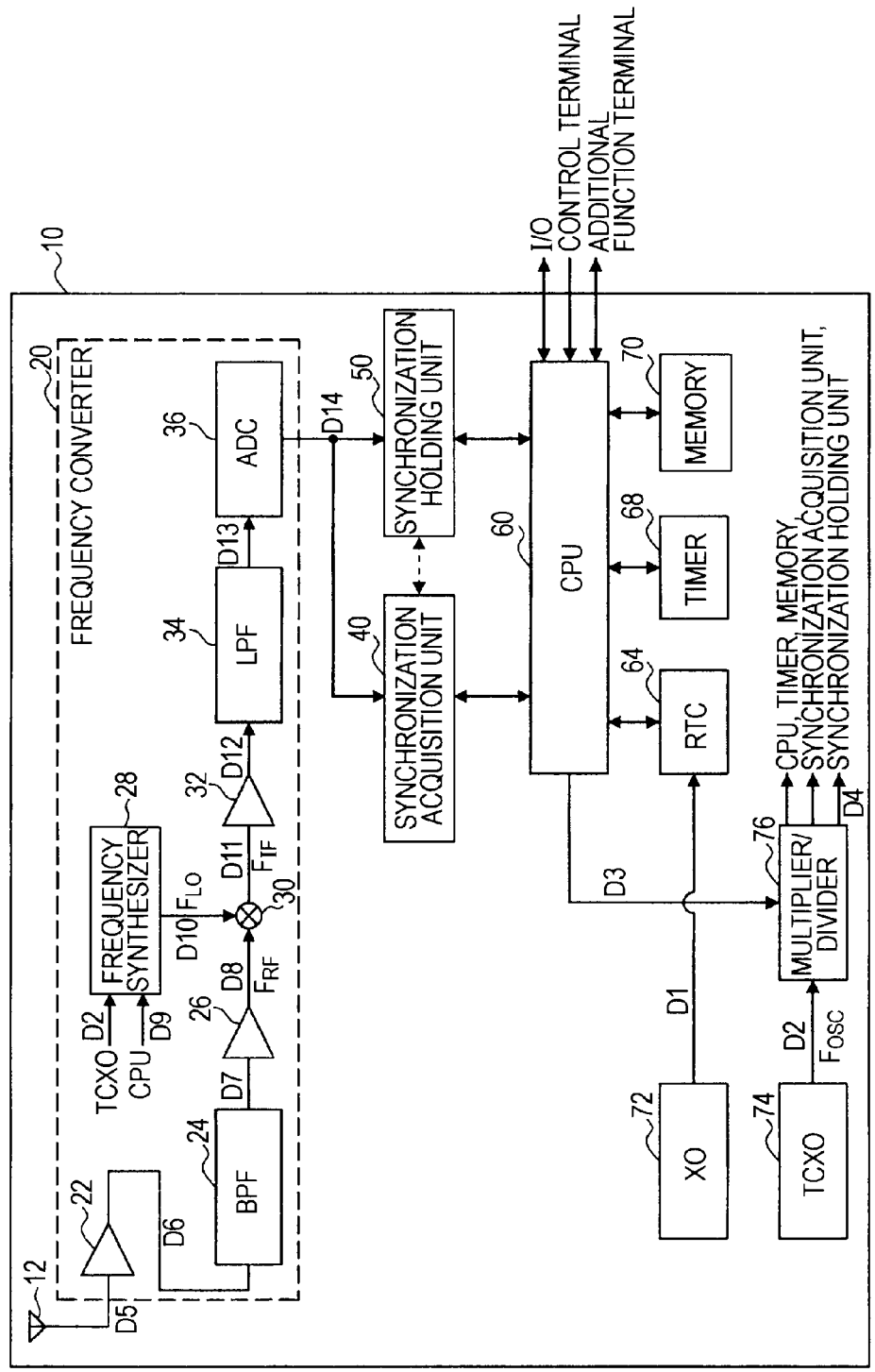
FIG. 1 is a block diagram illustrating one example of a hardware configuration of a GPS module associated with an embodiment of the invention.

Hereinafter, a preferred embodiment of the invention will be described in detail with reference to the accompanying drawings. In the specification and the drawings, the same reference numerals are used to designate elements having substantially the same functional configuration in order to avoid redundancy.

The description will be given in order of the following items.

1. GPS Module associated with Embodiment of Invention
2. GPS Module according to Embodiment of Invention

[GPS Module Associated with Embodiment of Invention]

First, the GPS module associated with the embodiment of the invention will be described. FIG. 1 is a block diagram illustrating one example of a hardware configuration of the GPS module associated with the embodiment of the invention.

In FIG. 1, the GPS module 10 includes an antenna 12, a frequency converter 20, a synchronization acquisition unit 40, a synchronization holding unit 50, a CPU (Central Processing Unit) 60, an RTC (Real Time Clock) 64, a timer 68 and a memory 70. Further, the GPS module 10 includes an XO (X'tal Oscillator) 72, a TCXO (Temperature Compensated X'tal Oscillator) 74 and a multiplier/divider 76.

The XO 72 oscillates a signal D1 with a predetermined frequency (e.g., about 32.768 kHz) to supply the RTC 64 with the signal D1. The TCXO 74 oscillates a signal D2 with a frequency (e.g., about 16.368 MHz) different from that of the signal D1 and supplies the signal D2 to the multiplier/divider 76 and a frequency synthesizer 28 which will be described later.

The multiplier/divider 76 multiplies or divides, or multiplies and divides the signal D2 supplied from the TCXO 74 based on directions from the CPU 60. Then, the multiplier/divider 76 supplies a signal D4, which is obtained by multiplying or dividing, or multiplying and dividing the signal D2, to the frequency synthesizer 28 and an ADC 36 of the frequency converter 20, the CPU 60, the timer 68, the memory 70, the synchronization acquisition unit 40 and the synchronization holding unit 50.

The antenna 12 receives a radio signal (e.g., an RF signal in which carrier of 1575.42 MHz is spread) including a navigation message and the like transmitted from a GPS satellite which is a satellite of a global positioning system, and converts the radio signal into an electrical signal D5 to supply the frequency converter 20 with the electrical signal D5.

The frequency converter 20 includes a LNA (Low Noise Amplifier) 22, a BPF (Band Pass Filter) 24, an amplifier 26, the frequency synthesizer 28, a multiplier 30, an amplifier 32, a LPF (Low Pass Filter) 34 and an ADC (Analog Digital Converter) 36. As described below, the frequency converter 20 down-converts the signal D5 with a high frequency of 1575.42 MHz, which is received in the antenna 12, into a signal D14 with a frequency of about 4.092 MHz for the facilitation of a digital signal process.

The LNA 22 amplifies the signal D5 supplied from the antenna 12 to supply a signal D6 to the BPF 24. The BPF 24 includes a SAW (Surface Acoustic Wave) filter, extracts only a specific frequency component from frequency components of the signal D6 amplified by the LNA 22, and supplies the extracted frequency component to the amplifier 26. The amplifier 26 amplifies a signal D7 (frequency $F_{RF}$) having the frequency component extracted by the BPF 24 to supply a signal D8 to the multiplier 30.

The frequency synthesizer 28 generates a signal D10 with a frequency $F_{LO}$ by using the signal D2 supplied from the TCXO 74 based on a direction D9 from the CPU 60. Then, the frequency synthesizer 28 supplies the multiplier 30 with the generated signal D10 with the frequency $F_{LO}$.

The multiplier 30 multiplies the signal D8 with the frequency $F_{RF}$ supplied from the amplifier 26 by the signal D10 with the frequency $F_{LO}$ supplied from the frequency synthesizer 28. That is, the multiplier 30 down-converts the high frequency signal into an IF (Intermediate Frequency) signal D11 (e.g., an IF signal with a frequency of about 4.092 MHz).

The amplifier 32 amplifies the IF signal D11 down-converted by the multiplier 30 to supply the LPF 34 with an IF signal D12.

The LPF 34 extracts a low frequency component from frequency components of the IF signal D12 amplified by the amplifier 32, and supplies the ADC 36 with a signal D13 with the extracted low frequency component. FIG. 1 illustrates an example in which the LPF 34 is disposed between the amplifier 32 and the ADC 36. However, a BPF (not shown) may be disposed between the amplifier 32 and the ADC 36.

The ADC 36 converts the IF signal D13 in an analog format supplied from the LPF 34 into an IF signal D14 in a digital format by sampling the IF signal D13, and supplies the synchronization acquisition unit 40 and the synchronization holding unit 50 with the IF signal D14 by one bit.

The synchronization acquisition unit 40 performs synchronization acquisition of a PRN (Pseudo-Random Noise) code of the IF signal D14, which is supplied from the ADC 36, by using the signal D4 supplied from the multiplier/divider 76 under the control of the CPU 60. Further, the synchronization acquisition unit 40 detects a carrier frequency of the IF signal D14. Then, the synchronization acquisition unit 40 supplies the synchronization holding unit 50 and the CPU 60 with the phase of the PRN code, the carrier frequency of the IF signal D14 and the like.

The synchronization holding unit 50 holds synchronization of the PRN code and the carrier of the IF signal D14, which is supplied from the ADC 36, by using the signal D4 supplied from the multiplier/divider 76 under the control of the CPU 60. In more detail, the synchronization holding unit 50 operates by employing the phase of the PRN code, which is supplied from the synchronization acquisition unit 40, and the carrier frequency of the IF signal D14 as an initial value. Further, the synchronization holding unit 50 demodulates the navigation message included in the IF signal D14 supplied from the ADC 36, and supplies the CPU 60 with the demodulated navigation message, the phase of the PRN code with high precision, and the carrier frequency.

The CPU 60 calculates the position and the speed of each GPS satellite based on the navigation message, the phase of the PRN code and the carrier frequency supplied from the synchronization holding unit 50, and calculates the position of the GPS module 10. Further, the CPU 60 may correct time information of the RTC 64 based on the navigation message. In addition, the CPU 60 may also be connected to an I/O terminal, a control terminal and an additional function terminal to perform various control processes in addition to the above processes.

The RTC 64 measures time by using the signal D1 with the predetermined frequency supplied from the XO 72. The time measured by the RTC 64 is appropriately corrected by the CPU 60.

The timer 68 measures time by using the signal D4 supplied from the multiplier/divider 76. The timer 68 is used when determining start timings of various controls by the CPU 60 and the like. For example, the CPU 60 uses the timer 68 when determining a start timing of an operation of a PRN code generator in the synchronization holding unit 50 based on the phase of the PRN code acquired by the synchronization acquisition unit 40.

The memory 70 includes a RAM (Random Access Memory), a ROM (Read-Only Memory) and the like, and functions as a work space for the CPU 60, a storage unit of programs, a storage unit of the navigation message and the like. For the memory 70, a RAM is used as a work area when various processes are performed by the CPU 60 and the like. Further, the RAM can be used for buffering various types of input data, and holding ephemeris and almanac serving as orbital information of a GPS satellite, which is obtained by the synchronization holding unit 50, and intermediate data or operation result data generated in an operation process. In addition, for the memory 70, a ROM is used for storing various programs, fixing data and the like. Moreover, for the memory 70, a non-volatile memory is used for storing the ephemeris and almanac serving as the orbital information of the GPS satellite, position information obtained through position measurement, the error amount of the TCXO 74 and the like during the interruption of power to the GPS module 10.

Furthermore, all elements of the GPS module 10 shown in FIG. 1, except for the XO 72, the TCXO 74, the antenna 12 and the BPF 24, may be mounted in an integrated circuit including one chip.

Figure 2:
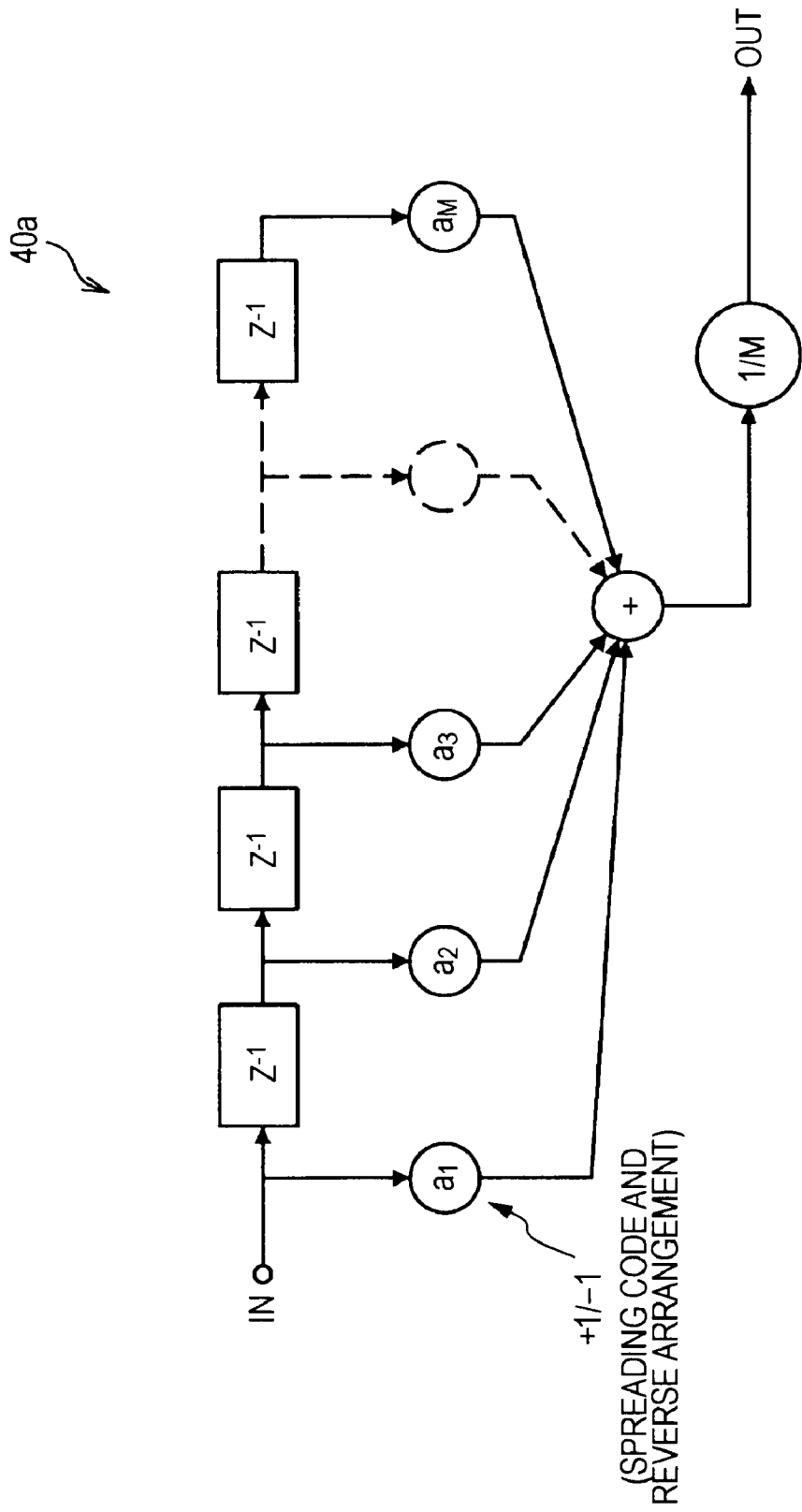
FIG. 2 is a block diagram illustrating one example of a more detailed configuration of a synchronization acquisition unit in FIG. 1.

The above-described synchronization acquisition unit 40, for example, uses a matched filter to perform synchronization acquisition of a spreading code at a high speed. In detail, the synchronization acquisition unit 40, for example, may also use a so-called transversal filter 40a shown in FIG. 2 as the matched filter. Alternatively, the synchronization acquisition unit 40, for example, may also use a digital matched filter 40b using FFT (Fast Fourier Transform) shown in FIG. 3 as the matched filter.

Figure 3:
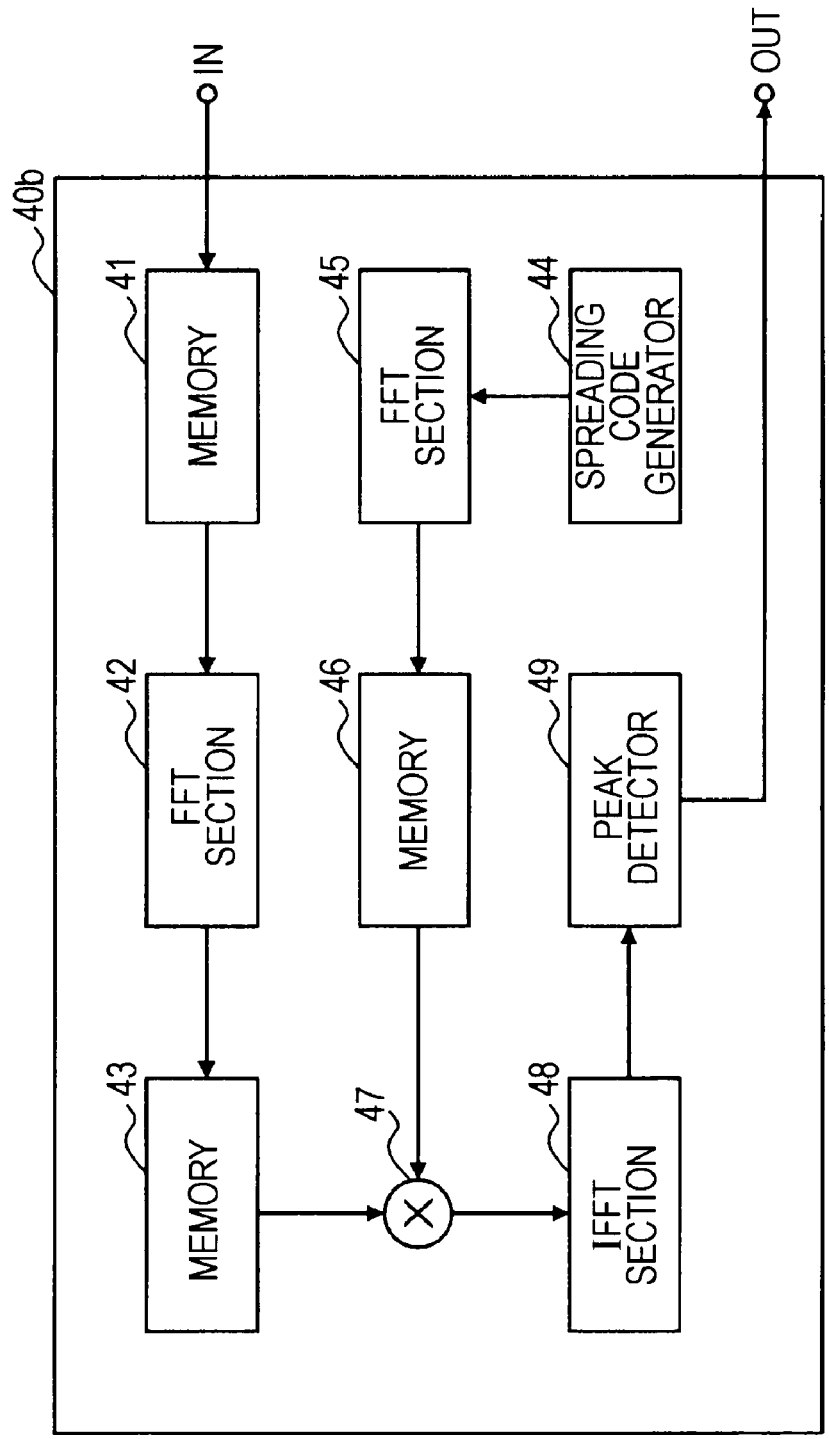
FIG. 3 is a block diagram illustrating one example of a more detailed configuration of a synchronization acquisition unit in FIG. 1.

For example, in FIG. 3, the digital matched filter 40b includes a memory 41, an FFT section 42, a memory 43, a spreading code generator 44, an FFT section 45, a memory 46, a multiplier 47, an IFFT (Inverse Fast Fourier Transform) unit 48 and a peak detector 49.

The memory 41 buffers the IF signal sampled by the ADC 36 of the frequency converter 20. The FFT section 42 reads the IF signal buffered by the memory 41 to perform FFT with respect to the IF signal. The memory 43 buffers a frequency domain signal converted from the IF signal of a time domain through the FFT in the FFT section 42.

Meanwhile, the spreading code generator 44 generates a spreading code identical to the spreading code in the RF signal from the GPS satellite. The FFT section 45 performs FFT with respect to the spreading code generated by the spreading code generator 44. The memory 46 buffers a spreading code of a frequency domain converted from a spreading code of a time domain through the FFT in the FFT section 45.

The multiplier 47 multiplies the frequency domain signal buffered in the memory 43 by the spreading code of the frequency domain buffered in the memory 46. The IFFT section 48 performs IFFT with respect to the frequency domain signal after the multiplication, which is output from the multiplier 47, thereby obtaining a correlation signal in a time domain between the spreading code in the RF signal from the GPS satellite and the spreading code generated by the spreading code generator 44. Further, the peak detector 49 detects a peak of the correlation signal output from the IFFT section 48.

The digital matched filter 40b may also be realized by software that executes processes of the FFT sections 42 and 45, the spreading code generator 44, the multiplier 47, the IFFT section 48 and the peak detector 49 by using a DSP (Digital Signal Processor).

Figure 4:
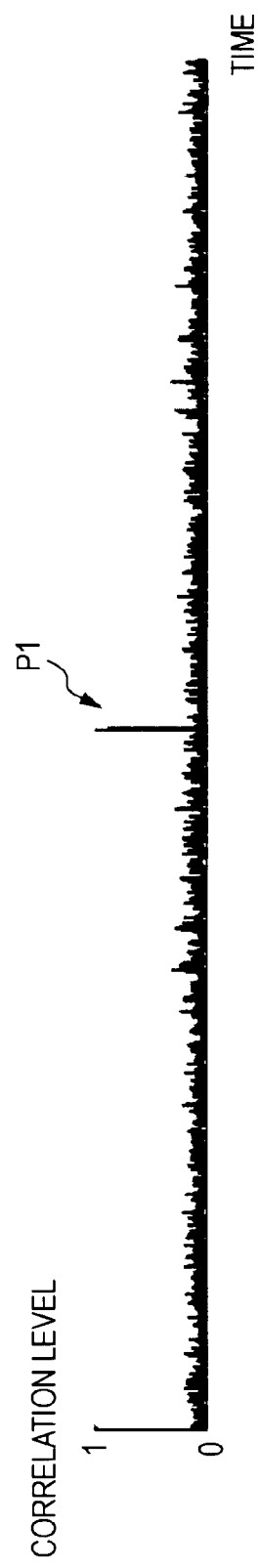
FIG. 4 is a diagram illustrating one example of the peak of a correlation signal output from a digital matched filter.
Figure 5:
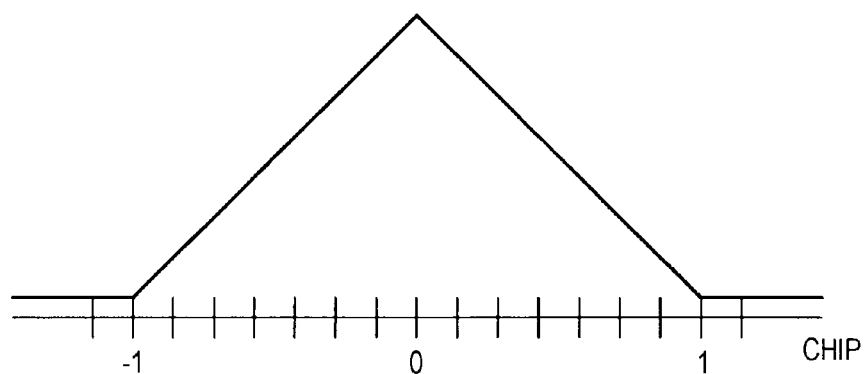
FIG. 5 is an enlarged view illustrating the vicinity of the peak of a correlation signal of FIG. 4.

FIG. 4 is a diagram illustrating one example of the peak of the correlation signal acquired by the above-described digital matched filter 40a or 40b. In FIG. 4, a peak P1 with a protruding correlation level is detected from an output waveform of the correlation signal of one period. Further, FIG. 5 is an enlarged view illustrating the vicinity of the peak P1 of the correlation signal. The position of the peak P1 on the time axis corresponds to the head of a spreading code. That is, the synchronization acquisition unit 40 can detect (i.e., detect the phase of the spreading code) synchronization of the signal received from the GPS satellite by detecting the peak P1 as described above.

Figure 6:
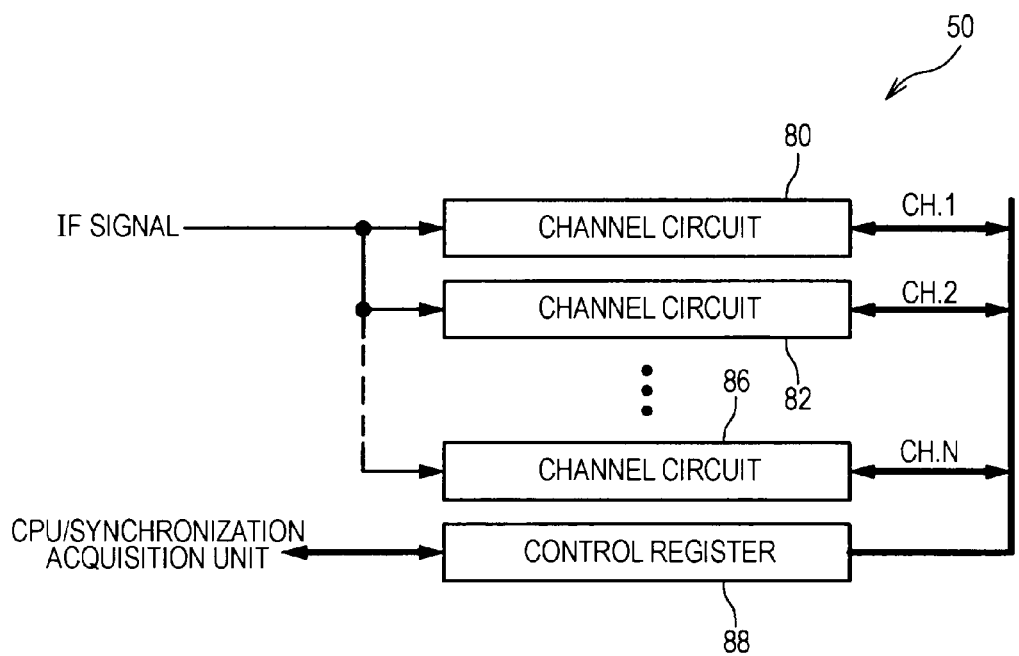
FIG. 6 is a block diagram illustrating one example of a more detailed configuration of a synchronization holding unit in FIG. 1.

Further, since the above-described synchronization holding unit 50 performs the synchronization holding with respect to a plurality of GPS satellites in a parallel manner, the synchronization holding unit 50, for example, includes a plurality of independent channel circuits 80, 82, 84 and 86 as shown in FIG. 6. The channel circuits 80, 82, 84 and 86 are assigned to respective detection results by the synchronization acquisition unit 40 according to the setting of a control register 88.

The channel circuits 80, 82, 84 and 86 have the same configuration. Hereinafter, the configuration of the channel circuit 80 will be representatively described.

Figure 7:
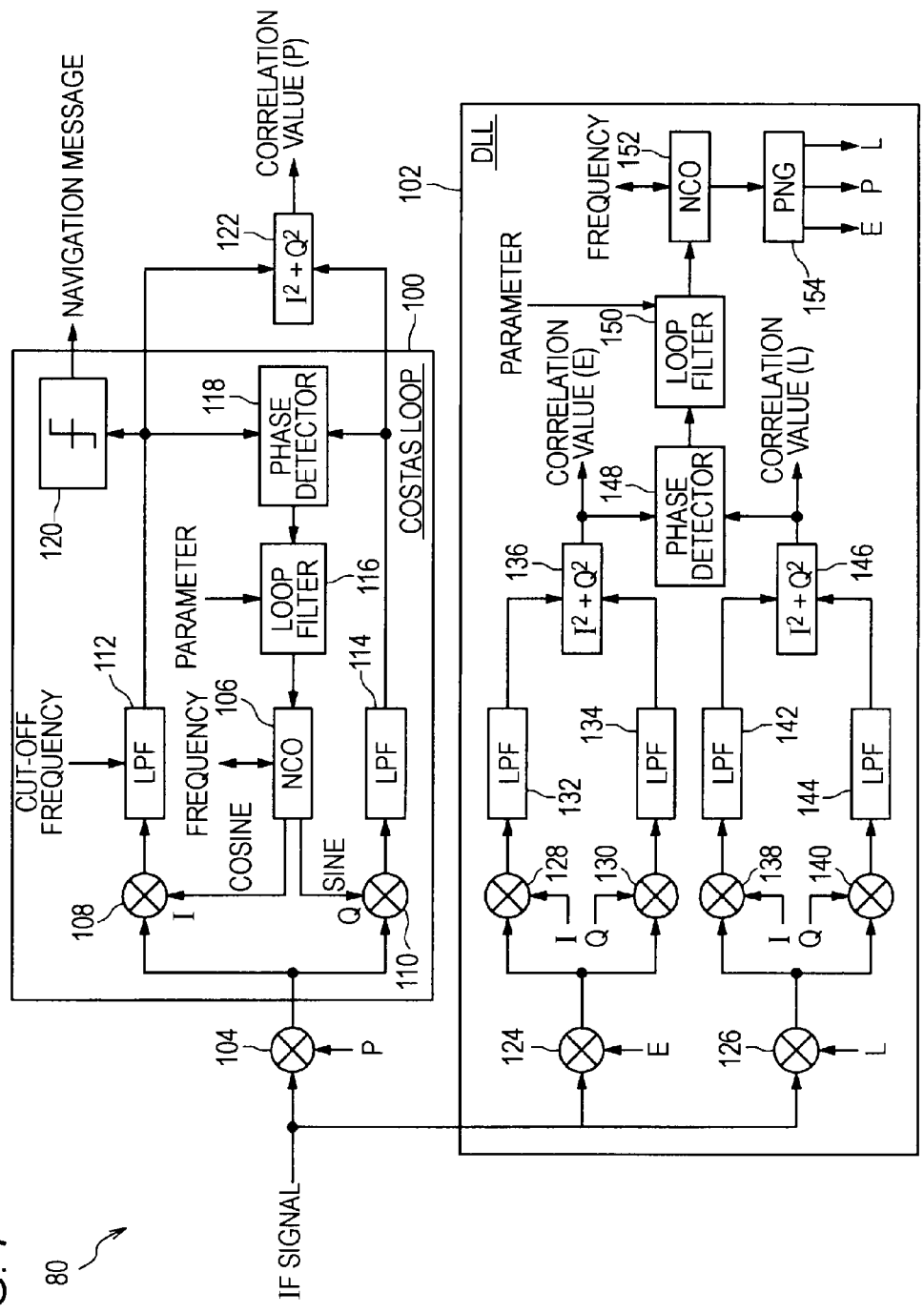
FIG. 7 is a block diagram illustrating one example of a more detailed configuration of a channel circuit in FIG. 6.

As described in FIG. 7, the channel circuit 80 is obtained by combining a Costas loop 100 for IF carrier synchronization, which performs both the synchronization acquisition and the synchronization holding, with a DLL (Delay Lock Loop) 102 for spreading code synchronization in the GPS module 10 associated with the embodiment of the invention.

The Costas loop 100 receives a signal obtained through multiplication, by a multiplier 104, of an IF signal corresponding to the above-described IF signal D14 and the spreading code (Prompt in FIG. 8) with a phase P (Prompt), which is generated by a spreading code generator (hereinafter, referred to as a PNG (PN Generator)) 154. Meanwhile, in the channel circuit 80, the DLL 102 receives the IF signal corresponding to the IF signal D14 obtained by the antenna 12 and the frequency converter 20.

In the Costas loop 100, a multiplier 108 multiplies the input signal by a cosine component of a reproduction carrier generated by an NCO (Numeric Controlled Oscillator) 106. Further, a multiplier 110 multiplies the input signal by a sine component of the reproduction carrier generated by the NCO 106. In the Costas loop 100, a predetermined frequency band component of the in-phase component signal obtained by the multiplier 108 passes through an LPF 112, and then is supplied to a phase detector 118, a binarization circuit 120 and a square sum calculation circuit 122. Further, in the Costas loop 100, a predetermined frequency band component of the quadrature component signal obtained by the multiplier 110 passes through an LPF 114, and then is supplied to the phase detector 118 and the square sum calculation circuit 122. In the Costas loop 100, phase information detected by the phase detector 118 based on the signals output from the LPFs 112 and 114 is supplied to the NCO 106 through a loop filter 116. In the Costas loop 100, after the signals output from the LPFs 112 and 114 are supplied to the square sum calculation circuit 122, a square sum ($I^2+Q^2$) calculated by the square sum calculation circuit 122 is output as a correlation value P with respect to the spreading code with a phase P. In addition, in the Costas loop 100, after the signal output from the LPF 112 is supplied to the binarization circuit 120, information obtained through the binarization is output as the navigation message.

Meanwhile, in the DLL 102, a multiplier 124 multiplies the input IF signal by the spreading code (Early in FIG. 8) with an advanced phase E (Early) as compared with the phase P, which is generated by a PNG 154. Further, a multiplier 126 multiplies the input IF signal by the spreading code (Late in FIG. 8) with a delayed phase L (Late) as compared with the phase P, which is generated by the PNG 154. In the DLL 102, a multiplier 128 multiplies the signal obtained by the multiplier 124 by the cosine component of the reproduction carrier generated by the NCO 106 in the Costas loop 100. Further, a multiplier 130 multiplies the signal obtained by the multiplier 124 by the sine component of the reproduction carrier generated by the NCO 106. In the DLL 102, a predetermined frequency band component of the in-phase component signal obtained by the multiplier 128 passes through an LPF 132, and then is supplied to a square sum calculation circuit 136. Further, in the DLL 102, a predetermined frequency band component of the quadrature component signal obtained by the multiplier 130 passes through an LPF 134, and then is supplied to the square sum calculation circuit 136. Furthermore, in the DLL 102, a multiplier 138 multiplies the signal obtained by the multiplier 126 by the cosine component of the reproduction carrier generated by the NCO 106 in the Costas loop 100. Further, a multiplier 140 multiplies the signal obtained by the multiplier 126 by the sine component of the reproduction carrier generated by the NCO 106. In the DLL 102, a predetermined frequency band component of the in-phase component signal obtained by the multiplier 138 passes through an LPF 142, and then is supplied to a square sum calculation circuit 146. Further, in the DLL 102, a predetermined frequency band component of the quadrature component signal obtained by the multiplier 140 passes through an LPF 144, and then is supplied to the square sum calculation circuit 146.

In the DLL 102, after signals output from the square sum calculation circuits 136 and 146 are supplied to a phase detector 148, phase information detected by the phase detector 148 based on these signals is supplied to an NCO 152 through a loop filter 150. In addition, the spread codes with the phases E, P and L are generated by the PNG 154 based on a signal with a predetermined frequency generated by the NCO 152. Moreover, in the DLL 102, a square sum ($I^2+Q^2$) calculated by the square sum calculation circuit 136 is output as a correlation value E with respect to the spreading code with the phase E. Further, in the DLL 102, a square sum ($I^2+Q^2$) calculated by the square sum calculation circuit 146 is output as a correlation value L with respect to the spreading code with the phase L.

As described above, in the synchronization holding unit 50 including the channel circuits 80, 82, 84 and 86 having the same configuration as that of the circuit obtained by combining the Costas loop 100 for IF carrier synchronization with the DLL 102 for spreading code synchronization, before operation start, satellite numbers of the GPS satellites, the phases of the spreading codes, and the carrier frequency are set as an initial value. The setting of the initial value is performed through direct communication with the synchronization acquisition unit 40 or through the CPU 60 that controls the synchronization acquisition unit 40 and the synchronization holding unit 50.

In the above-described GPS module 10, the IF signal is normally sampled with a frequency of the TCXO 74, and a typical frequency is 16.368 MHz, 18.414 MHz and the like. The two frequencies are sixteen times and eighteen times as high as a chip rate of 1.023 MHz of the spreading codes in the GPS module 10, respectively.

Since the synchronization acquisition unit 40 normally down-samples the IF signal with a frequency lower than the sampling frequency of the TCXO 74 due to system limitation, the synchronization acquisition unit 40 stores a small amount of sample data in a memory (e.g., the memory 41) and performs the synchronization acquisition process. The synchronization holding unit 50 does not down-sample the IF signal and inputs the sampling frequency of the TCXO 74. Consequently, as shown in the enlarged view of FIG. 5 illustrating the inverse spreading output, the time of a peak can be specified with high time resolution and position accuracy in position measurement operation can be improved. For example, when the sampling frequency of the TCXO 74 is 16.368 MHz, time resolution corresponds to a ¹⁄₁₆ chip length. For example, when one chip is 300 m, distance resolution can be improved up to 18.75 m (300/16).

In the above-described synchronization holding unit 50, in order to ensure time resolution, the LPFs of an initial stage, that is, the LPFs 112, 114, 132, 134, 142 and 144 normally operate at the clock frequency of the TCXO 74. As shown in FIG. 7, each channel circuit includes four to six LPFs of the initial stage. Further, as shown in FIG. 6, the synchronization holding unit 50 includes about 8 to 20 channel circuits. Thus, if the LPFs of the initial stage of each channel circuit operate at the clock frequency of the TCXO 74, the power consumption and circuit size may be increased.

[GPS Module According to Embodiment of Invention]

Next, the GPS module according to the embodiment of the invention will be described. According to the embodiment of the invention, the GPS module has the same configuration and operation as those of the GPS module associated with the embodiment of the invention, except for a signal processor 200 which is not provided in the frequency converter 20 of FIG. 1, which will be described later. Hereinafter, different configuration and operation will be described in order to avoid redundancy.

Figure 9:
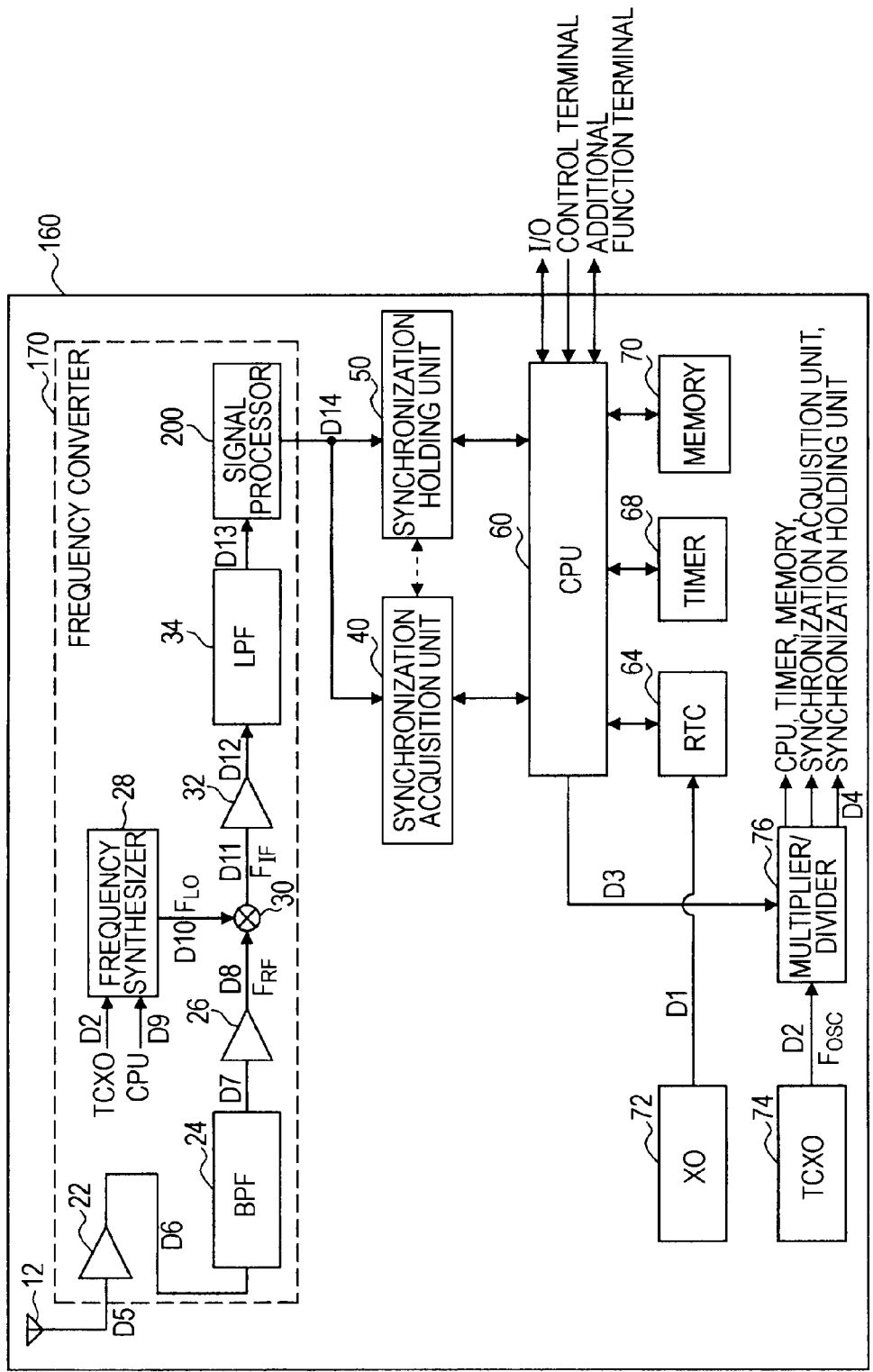
FIG. 9 is a block diagram illustrating one example of a hardware configuration of a GPS module according to an embodiment of the invention.

FIG. 9 is a block diagram illustrating one example of a hardware configuration of the GPS module according to the embodiment of the invention.

In FIG. 9, the GPS module 160 includes the antenna 12, a frequency converter 170, the synchronization acquisition unit 40, the synchronization holding unit 50, the CPU 60, the RTC 64, the timer 68, the memory 70, the XO 72, the TCXO 74 and the multiplier/divider 76.

The frequency converter 170 is one example of a frequency conversion-discretization unit and a second frequency converting section of the invention. The frequency converter 170 includes the LNA 22, the BPF 24, the amplifier 26, the frequency synthesizer 28, the multiplier 30, the amplifier 32, the LPF 34 and the signal processor 200. As described below, the frequency converter 170 down-converts the signal D5 with a high frequency of 1575.42 MHz, which is received in the antenna 12, into the signal D14. In detail, in order to reduce the circuit size and power consumption of the synchronization acquisition unit 40 and the synchronization holding unit 50 of a rear stage, the frequency converter 170 down-converts the signal D5 into the signal D14 as the IF signal in a digital format of a frequency bandwidth including 0 Hz.

The LNA 22 amplifies the signal D5 supplied from the antenna 12 which is one example of a receiving unit according to the embodiment of the invention, and supplies the signal D6 to the BPF 24. The BPF 24 extracts only a specific frequency component from frequency components of the signal D6 amplified by the LNA 22, and supplies the extracted frequency component to the amplifier 26. The amplifier 26 amplifies the signal D7 (frequency $F_{RF}$) having the frequency component extracted by the BPF 24 to supply the signal D8 to the multiplier 30.

The frequency synthesizer 28 generates the signal D10 with the frequency $F_{LO}$ by using the signal D2 supplied from the TCXO 74 based on the direction D9 from the CPU 60. Then, the frequency synthesizer 28 supplies the multiplier 30 with the generated signal D10 with the frequency $F_{LO}$.

The multiplier 30 is one example of a first frequency converting section according to the embodiment of the invention. The multiplier 30 multiplies the signal D8 with the frequency $F_{RF}$ supplied from the amplifier 26 by the signal D10 with the frequency $F_{LO}$ supplied from the frequency synthesizer 28. That is, the multiplier 30 down-converts the high frequency signal into the IF (Intermediate Frequency) signal D11 (e.g., an IF signal with a frequency of about 4.092 MHz).

The amplifier 32 amplifies the IF signal D11 down-converted by the multiplier 30 to supply the LPF 34 with the IF signal D12.

The LPF 34 extracts a low frequency component from frequency components of the IF signal D12 amplified by the amplifier 32, and supplies the ADC 36 with the signal D13 with the extracted low frequency component.

As described below, the signal processor 200 down-converts the IF signal D13 supplied from the LPF 34 into the signal D14 as the IF signal in a digital format of a frequency bandwidth including 0 Hz.

Figure 10:
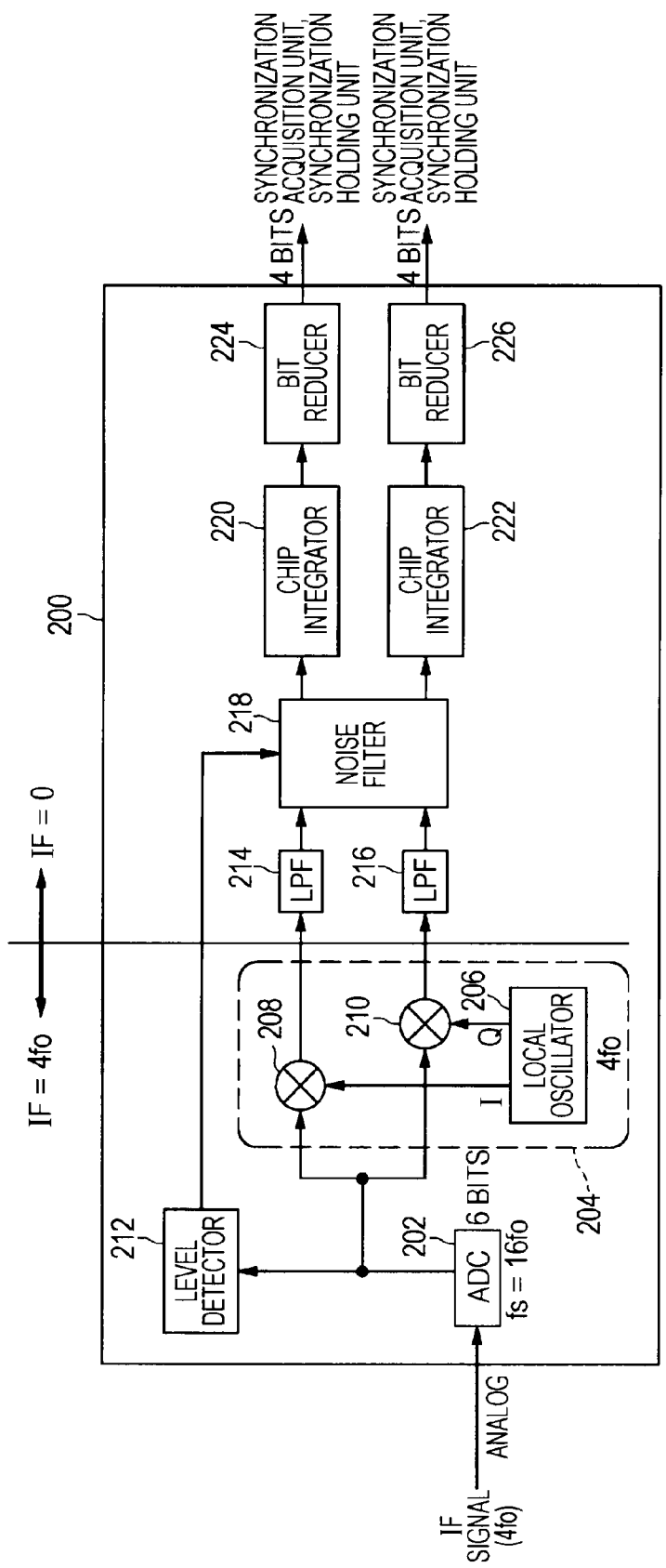
FIG. 10 is a block diagram illustrating one example of the schematic configuration of a signal processor provided in a frequency converter of FIG. 9.

FIG. 10 is a block diagram illustrating one example of the schematic configuration of the signal processor 200 provided in the frequency converter 170 of FIG. 9.

In FIG. 10, the signal processor 200 includes an ADC 202, a frequency converting section 204, a level detector 212, LPFs 214 and 216, a noise filter 218, chip integrators 220 and 222, and bit reducers 224 and 226.

The ADC 202 is one example of a discretizing section according to the embodiment of the invention. The ADC 202 discretizes 4fo (fo=1.023 MHz) input in an analog format, that is, an IF signal of 4.092 MHz, with a sampling frequency of 16fo, and outputs a discretized signal as a digital signal. Further, the ADC 202 outputs a discretized signal with the predetermined number of bits (e.g., 6 bits). The discretized signal output from the ADC 202 is input to multipliers 208 and 210 in the frequency converting section 204 as well as the level detector 212.

A local oscillator 206 in the frequency converting section 204 generates the same frequency as that of the discretized signal output from the ADC 202, and inputs a cosine component of the generated complex carrier to the multiplier 208. Further, the local oscillator 206 inputs a sine component of the generated complex carrier to the multiplier 210.

Figure 15:
FIG. 15 is a graph illustrating one example of frequency characteristics of a signal output from a frequency converting section provided in a signal processor.

The multiplier 208 multiplies the discretized signal by the cosine component of the complex carrier to output an in-phase component signal. The multiplier 210 multiplies the discretized signal by the sine component of the complex carrier to output a quadrature component signal. FIG. 15 illustrates frequency characteristics of discretized signals output from the multipliers 208 and 210. As shown in FIG. 15, the discretized signals output from the multipliers 208 and 210 have frequency signals of a frequency band including 0 Hz and a predetermined frequency band including 8fo.

The level detector 212 derives an average value or an integrated value over a predetermined time length based on the discretized signal output from the ADC 202, and outputs the average value or the integrated value.

The LPF 214 receives the in-phase component signal output from the multiplier 208 to allow a frequency band component including 0 Hz of the in-phase component signal to pass therethrough. The LPF 216 receives the quadrature component signal output from the multiplier 210 to allow a frequency band component including 0 Hz of the quadrature component signal to pass therethrough.

The noise filter 218 receives the signals output from the LPFs 214 and 216 and removes an external noise from the signals based on the average value or the integrated value output from the level detector 212. The in-phase component signal in the noise filter 218, from which the external noise is removed, is input to the chip integrator 220, and the quadrature component signal in the noise filter 218, from which the external noise is removed, is input to the chip integrator 222.

Figure 14:
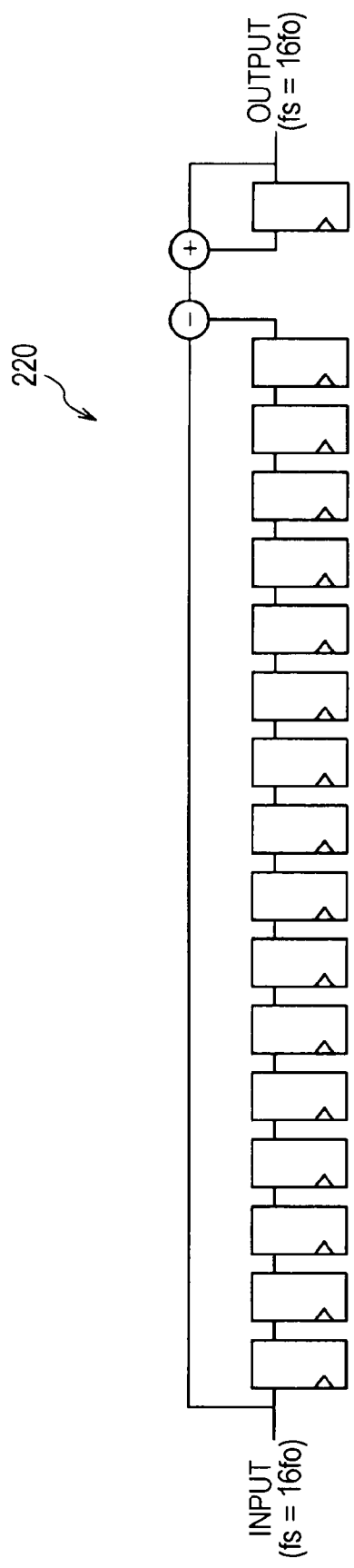
FIG. 14 is a block diagram illustrating one example of the schematic configuration of a chip integrator.

The chip integrators 220 and 222 are one example of a filter unit according to the embodiment of the invention. As shown in FIG. 14, the chip integrator 220, for example, is prepared in the form of a moving average filter of 16 samples provided with 16 flip-flops. The chip integrator 222 is prepared in the form of a moving average filter of 16 samples provided with 16 flip-flops, similarly to the chip integrator 220. Details of the chip integrators 220 and 222 will be described later. The in-phase component signal having passed through the chip integrator 220 is input to the bit reducer 224, and the quadrature component signal having passed through the chip integrator 222 is input to the bit reducer 226.

The bit reducers 224 and 226 are one example of a reduction section according to the embodiment of the invention. The bit reducers 224 and 226 reduce the number of bits of the input signals, respectively. For example, the bit reducers 224 and 226 reduce 2 bits from input signals of 6 bits to output signals of 0bits. The signals output from the bit reducers 224 and 226 are input to the synchronization acquisition unit 40 and the synchronization holding unit 50, respectively.

Returning to FIG. 9, the synchronization acquisition unit 40 performs synchronization acquisition of the PRN (Pseudo-Random Noise) code of the IF signal D14, which is supplied from the signal processor 200, by using the signal D4 supplied from the multiplier/divider 76 under the control of the CPU 60. Further, the synchronization acquisition unit 40 detects a carrier frequency of the IF signal D14. Then, the synchronization acquisition unit 40 supplies the synchronization holding unit 50 and the CPU 60 with the phase of the PRN code, the carrier frequency of the IF signal D14 and the like.

The synchronization holding unit 50 holds synchronization of the PRN code and the carrier of the IF signal D14, which is supplied from the signal processor 200, by using the signal D4 supplied from the multiplier/divider 76 under the control of the CPU 60. In more detail, the synchronization holding unit 50 operates by employing the phase of the PRN code and the carrier frequency of the IF signal D14, which are supplied from the synchronization acquisition unit 40, as an initial value. Further, the synchronization holding unit 50 demodulates the navigation message included in the IF signal D14 supplied from the signal processor 200, and supplies the CPU 60 with the demodulated navigation message, the phase of the PRN code with high precision and the carrier frequency.

The CPU 60 calculates the position and the speed of each GPS satellite based on the navigation message, the phase of the PRN code and the carrier frequency supplied from the synchronization holding unit 50, and calculates the position of the GPS module 10.

Figure 12:
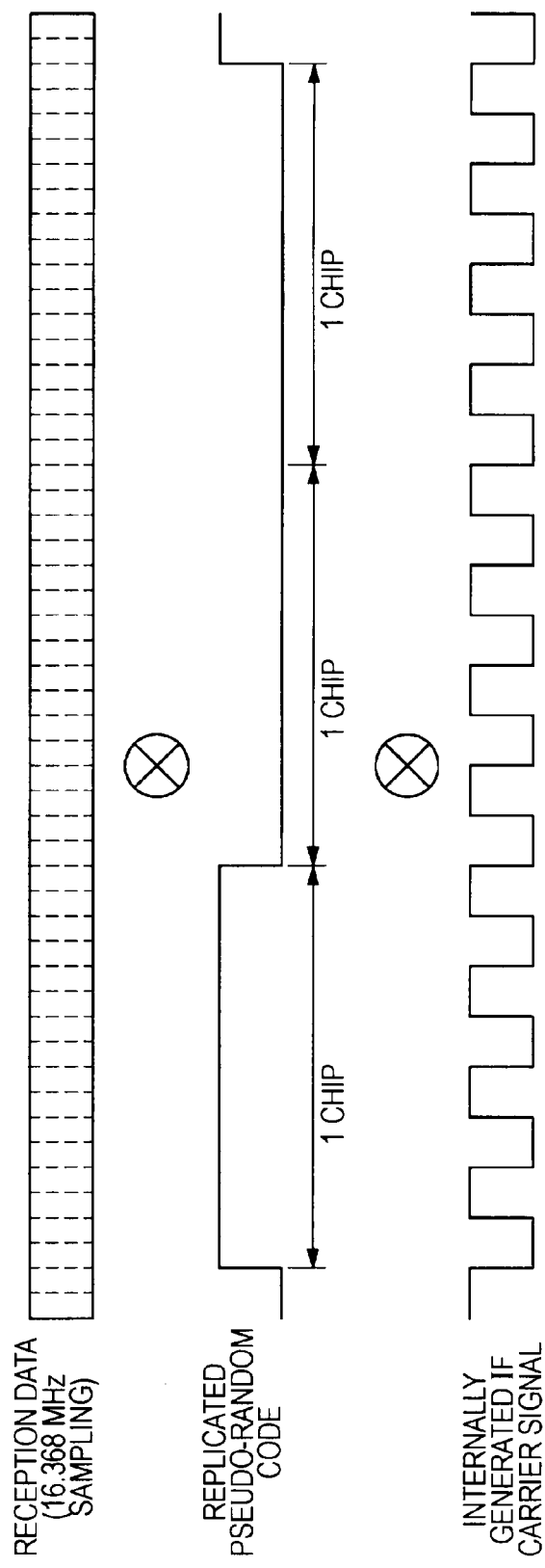
FIG. 12 is a diagram illustrating an inverse spread method.
Figure 13:
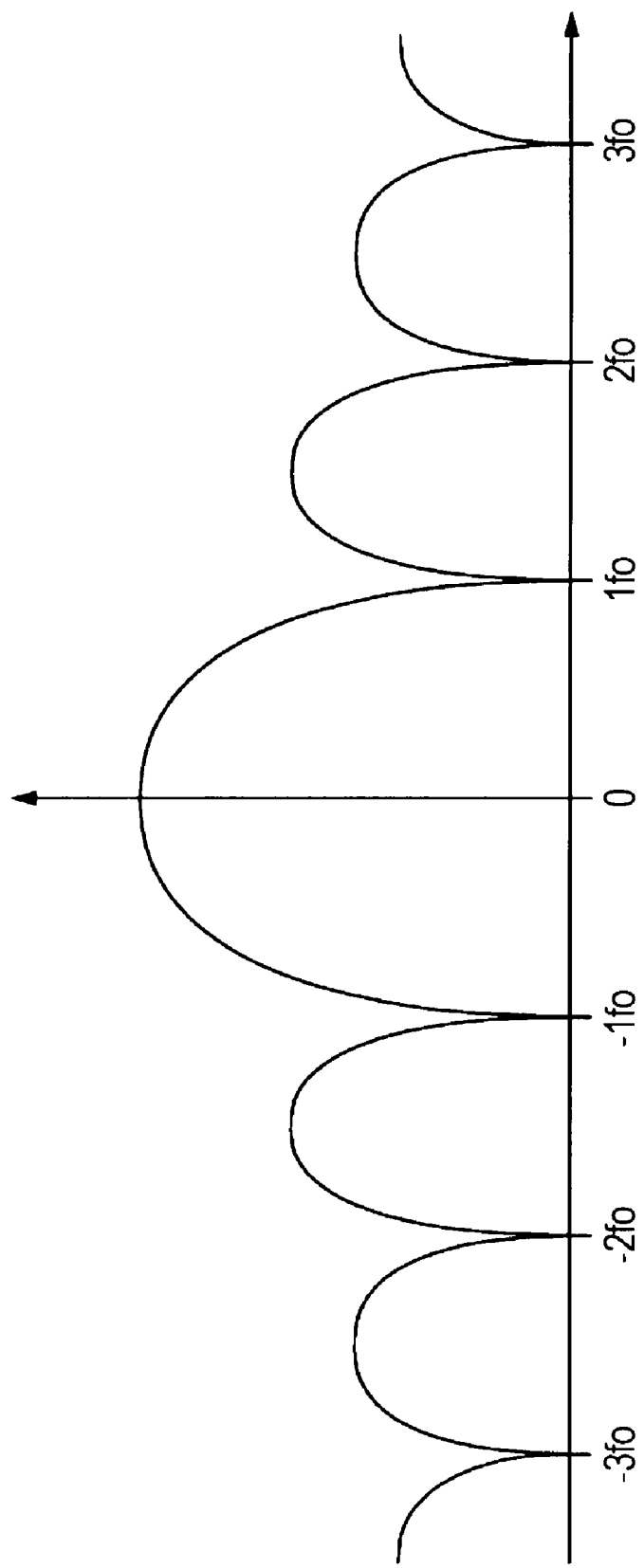
FIG. 13 is a graph illustrating one example of frequency characteristics of a moving average filter.

Meanwhile, according to an inverse spread method, as shown in FIG. 12, reception data, a replicated pseudo-random code and an internally generated IF carrier signal are multiplied with one another, and the resultant of the multiplication is added. In FIG. 12, the frequency of the IF carrier signal is four times as high as the chip rate of the replicated pseudo-random code. When the carrier frequency of the reception data is equal to a frequency of a frequency band including 0 Hz in advance, the internally generated IF carrier signal is also equal to the frequency of the frequency band including 0 Hz. In such a case, since reception data (in FIG. 12, reception data of 16 samples) corresponding to one chip of the replicated pseudo-random code is added in advance, the pseudo-random code can be multiplied. Adding in advance the reception data corresponding to one chip is equivalent to passage of an LPF operating as a moving average filter having frequency characteristics in which the frequency (fo=1.023 MHz) of a chip rate becomes the initial notch frequency, as shown in FIG. 13. In addition, since the Doppler frequency of a satellite remaining in the reception data and a remaining carrier frequency due to an offset of the TCXO 74 are at most several 10 KHz, the frequency sufficiently belongs to a passband in the LPF of the above-described moving average filter.

In addition, an adder of one chip adds 16 samples of the reception data. However, since output is made only once with respect to the 16 samples, a resolution corresponds to one chip. In this regard, according to the embodiment of the invention, the chip integrator 220 (222) as shown in FIG. 14 is provided, so that output is made without changing a sampling rate as a moving addition. Consequently, a signal of a bandwidth, which is equal to that of a normal down-sampling (thinned-out sampling) circuit, is oversampled, so that a resolution can be maintained.

According to the operation of the above-described moving average filter, the result of inverse spread is maximized when the pseudo-random code serving as the spreading code included in the reception data of FIG. 12 has synchronized with the replicated pseudo-random code. When the pseudo-random code is shifted with respect to the replicated pseudo-random code by one chip or more, the result of the inverse spread is minimized. Further, when the pseudo-random code is shifted with respect to the replicated pseudo-random code in one chip, the result of the inverse spread is reduced in proportion to the size of shift as shown in FIG. 5.

In addition, in FIG. 12, since the reception data of 16 samples is added, data of 4 bits is increased at this time. When taking random characteristics of an IF signal into consideration, data of 2 bits may be increased. In this regard, according to the embodiment of the invention, the bit reducers 224 and 226 are provided to reduce the number of bits of an output signal.

According to the embodiment of the invention, the IF signal of 4.092 MHz is discretized with a sampling frequency of a chip rate or more of a spreading code, so that the discretized signal is converted into a discretized signal of a frequency bandwidth including 0 Hz. Further, after the discretized signal is input to the moving average filter that performs a moving average with respect to a discretized signal by one chip of a spreading code, the output of the moving average filter is input to the synchronization acquisition unit 40 and the synchronization holding unit 50. Consequently, the circuit size of the LPF, which is included in the synchronization acquisition unit 40 and the synchronization holding unit 50 and each channel circuit of the synchronization holding unit 50, can be reduced, resulting in the reduction in the circuit size of the GPS module.

Figure 11:
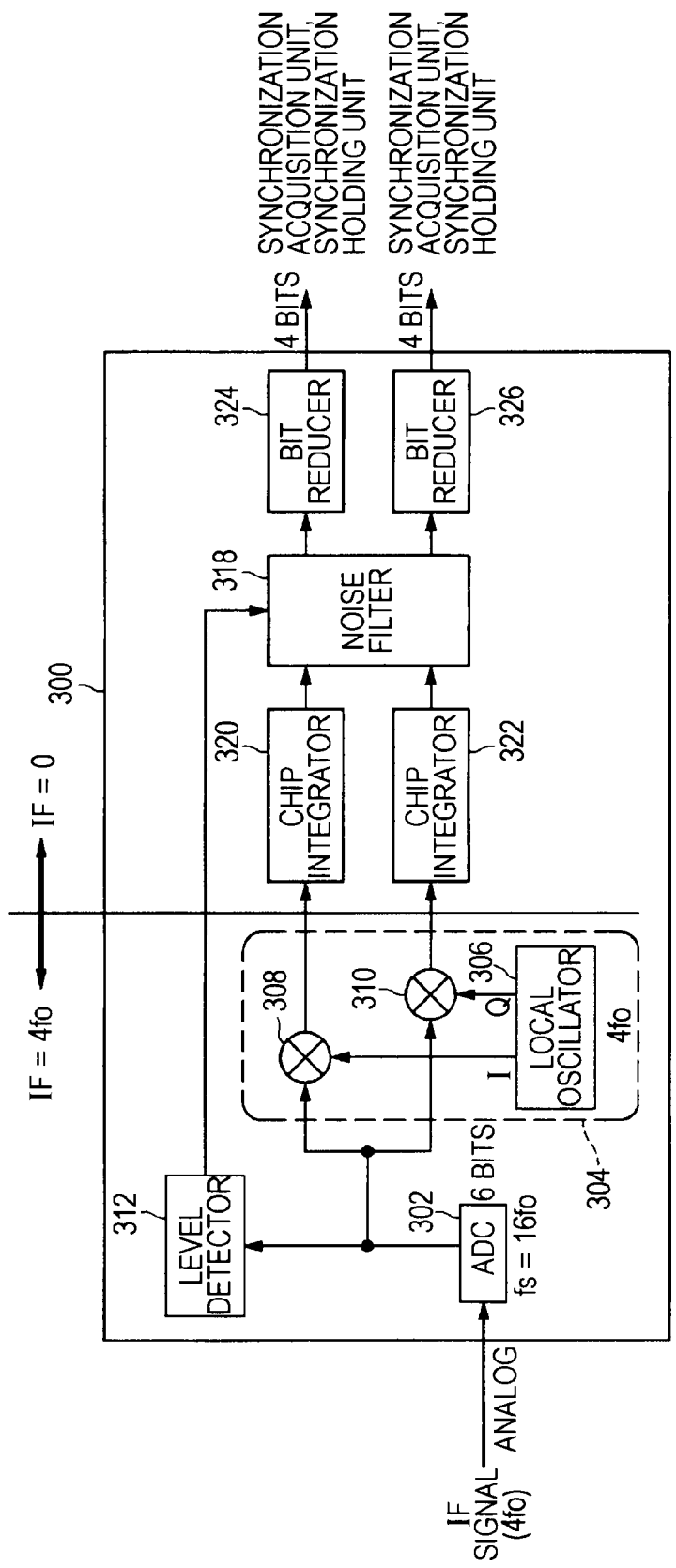
FIG. 11 is a block diagram illustrating one example of the schematic configuration of a signal processor provided in a frequency converter of FIG. 9.

The above-described frequency converter 170 includes the signal processor 200 in which the output of the frequency converting section 204 is input to the LPFs 214 and 216. However, as shown in FIG. 11, the frequency converter 170 may include a signal processor 300 in which the output of a frequency converting section 304 is input to chip integrators 320 and 322. In FIG. 11, the signal processor 300 includes an ADC 302, the frequency converting section 304, a level detector 312, the chip integrators 320 and 322, a noise filter 318 and bit reducers 324 and 326. Since the chip integrators 320 and 322 have frequency characteristics in which a frequency of N×fo (N is an integer other than 0) shown in FIG. 13 is equal to a notch frequency, they can allow a frequency band component including 0 Hz of an output signal from the frequency converting section 304 shown in FIG. 15 to pass therethrough. In such a case, the LPFs 214 and 216 in the signal processor 200 can be omitted.

Figure 16:
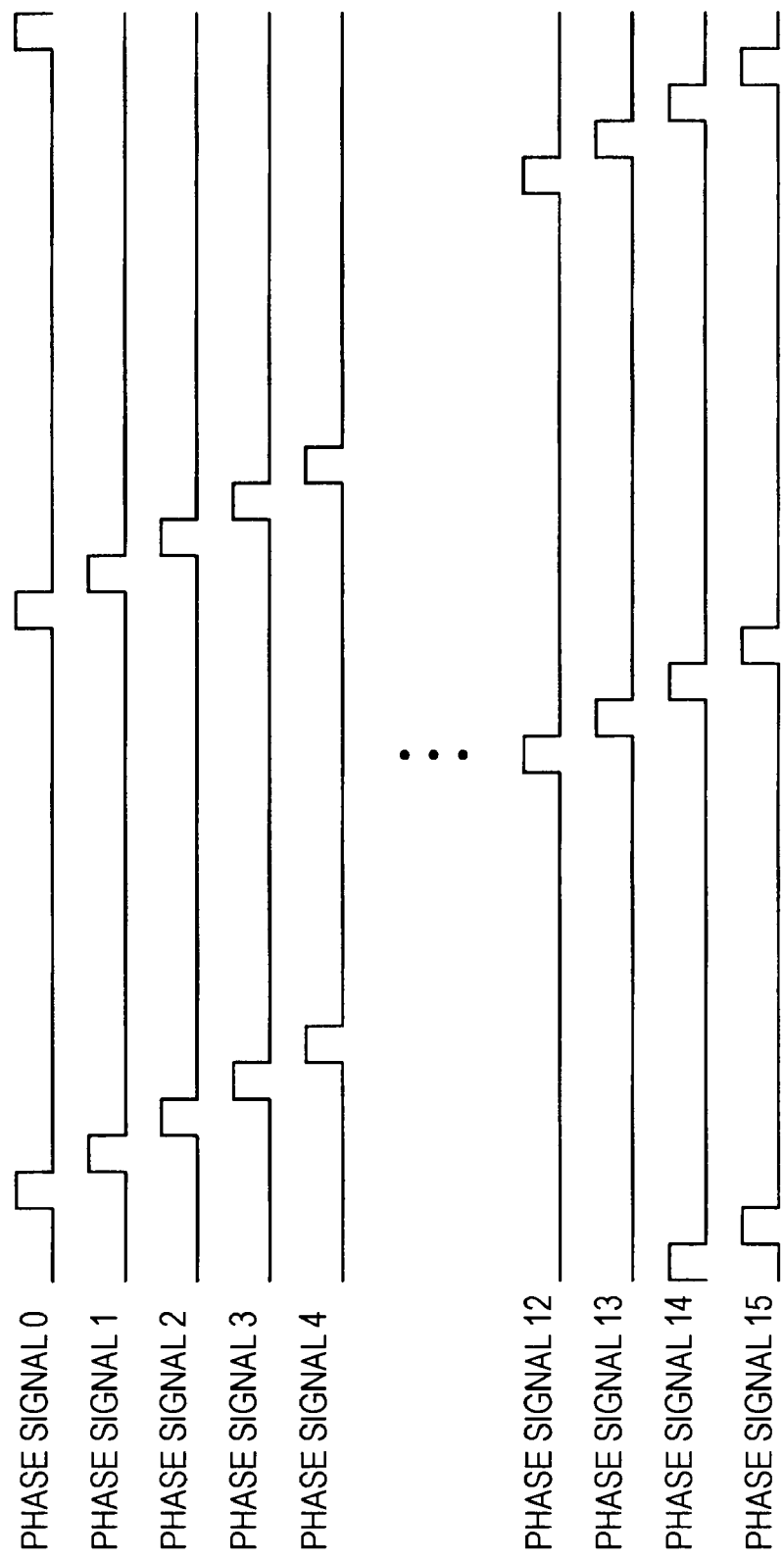
FIG. 16 is a diagram illustrating one example of a clock signal used for a synchronization acquisition unit and a synchronization holding unit according to an embodiment of the invention.
Figure 19:
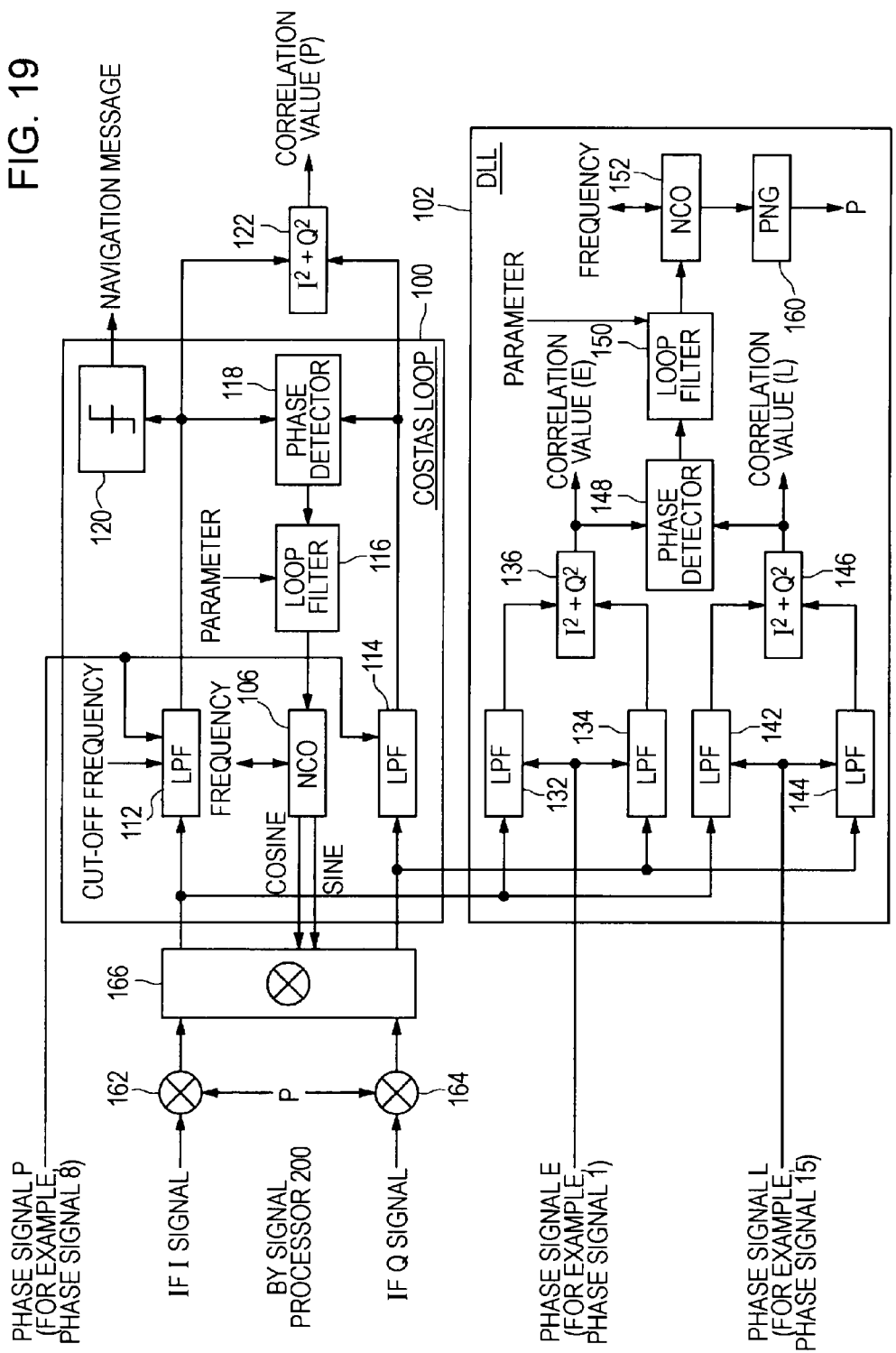
FIG. 19 is a block diagram illustrating one example of a more detailed configuration of a synchronization holding unit in FIG. 9.

As described above, the signal output from the frequency converter 170 is a digital IF signal of a frequency bandwidth including 0 Hz. Thus, the synchronization acquisition unit 40 and the synchronization holding unit 50, for example, may use 16 types of phase signals with different phases, which output one pulse as a multi-phase clock every 16 clocks, as shown in FIG. 16. FIG. 19 is a block diagram illustrating one example of a more detailed configuration of the synchronization holding unit 50 in FIG. 9. In FIG. 19, multipliers 162 and 164 multiply the I signal and the Q signal of the IF signal corresponding to the above-described IF signal D14 by a phase signal P (e.g., the phase signal 8 in FIG. 16) with a phase P (Prompt) generated by the spreading code generator 154, and a complex multiplier 166 multiplies a signal output from the multipliers 162 and 164 by cosine and sine components of a reproduction carrier generated by an NCO 106. Then, a signal output from the complex multiplier 166 is input to the Costas loop 100 and the DLL 102. The synchronization acquisition unit 40 and the synchronization holding unit 50 select a phase signal designated from the phase signals shown in FIG. 16 and perform an operation only when the selected phase signal is in an active state. In general, the power consumption of the circuit constituting the synchronization acquisition unit 40 and the synchronization holding unit 50 is proportional to the frequency of an operation clock. Consequently, the frequency of the operation clock of the circuit can be reduced to 1.023 MHz by using the above-described phase signal without reducing time resolution, and the power consumption of the circuit can be reduced.

Figure 8:
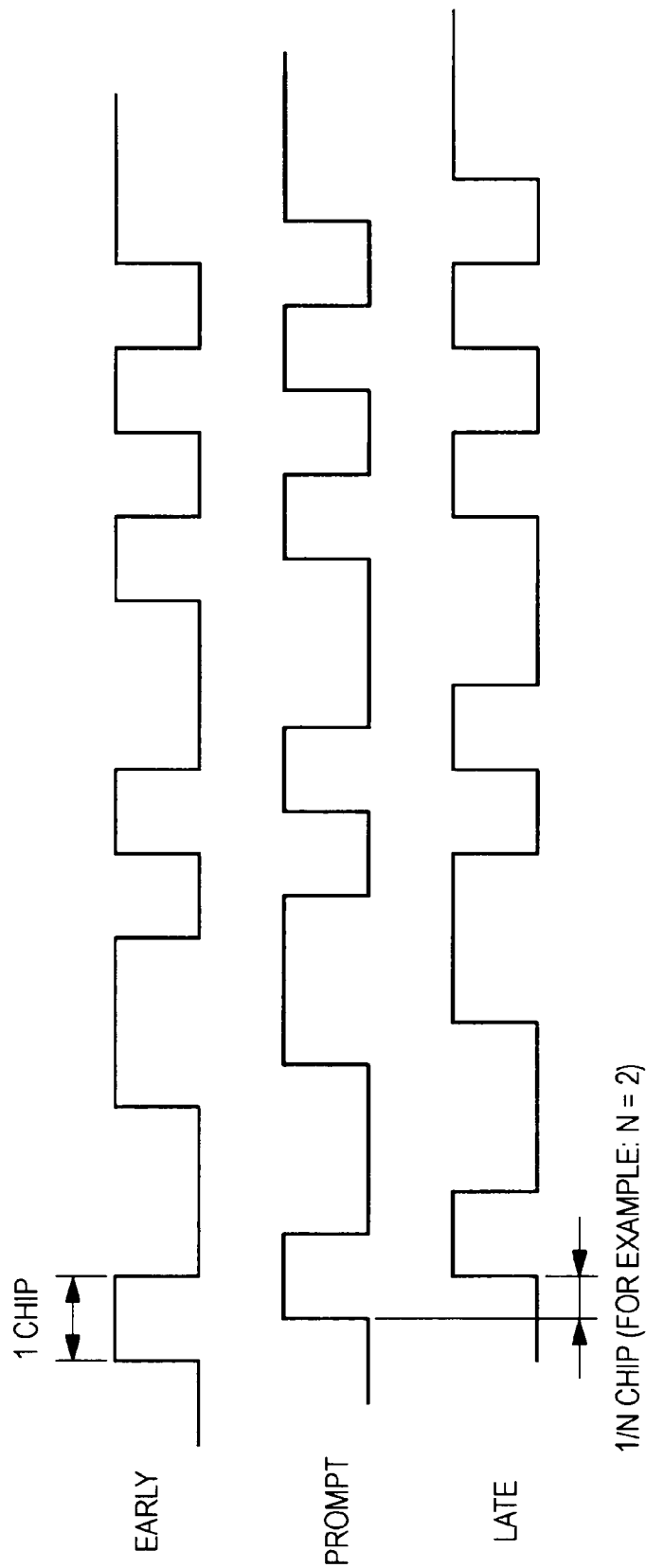
FIG. 8 is a diagram illustrating one example of a spreading code generated by a spreading code generator in FIG. 7.

In addition, the above-described phase signal is used, so that the Early signal and Late signal shown in FIG. 8 may not be generated by the pseudo-random code generator 154 of the DLL 102 in FIG. 7. In the DLL 102 in FIG. 7, the phase of the pseudo-random code is changed with time resolution of 16fo based on the frequency of the NCO 152. However, in the DLL 102 in FIG. 19, the multi-phase clock as shown in FIG. 16 is used, so that the pseudo-random codes of Early and Late may not be generated. In the case of using the multi-phase clock, even if the frequency of the operation clock of the circuit is reduced, a phase to be sampled is changed, so that time resolution in the DLL 102 can be maintained.

In the above-described GPS module 10, for example, when using the TCXO 74 of 16.368 MHz, the frequency of the IF signal output from the frequency converter 20 in FIG. 1 is normally 4.092 MHz due to the simplification of the configuration of the frequency synthesizer 28. The configuration of the frequency synthesizer 28 is changed, so that the IF signal can be replaced with a signal of a frequency band including 0 Hz. However, in general, in the case of a GPS module in which the total gain exceeds 100 dB due to the constitution of a high frequency analog circuit, control of a DC offset may be difficult. In this regard, in the GPS module 160 according to the embodiment of the invention, the above-described digital circuit changes the IF signal to the signal of the frequency band including 0 Hz. Consequently, as described above, the circuit size and power consumption of the GPS module can be reduced.

Figure 17:
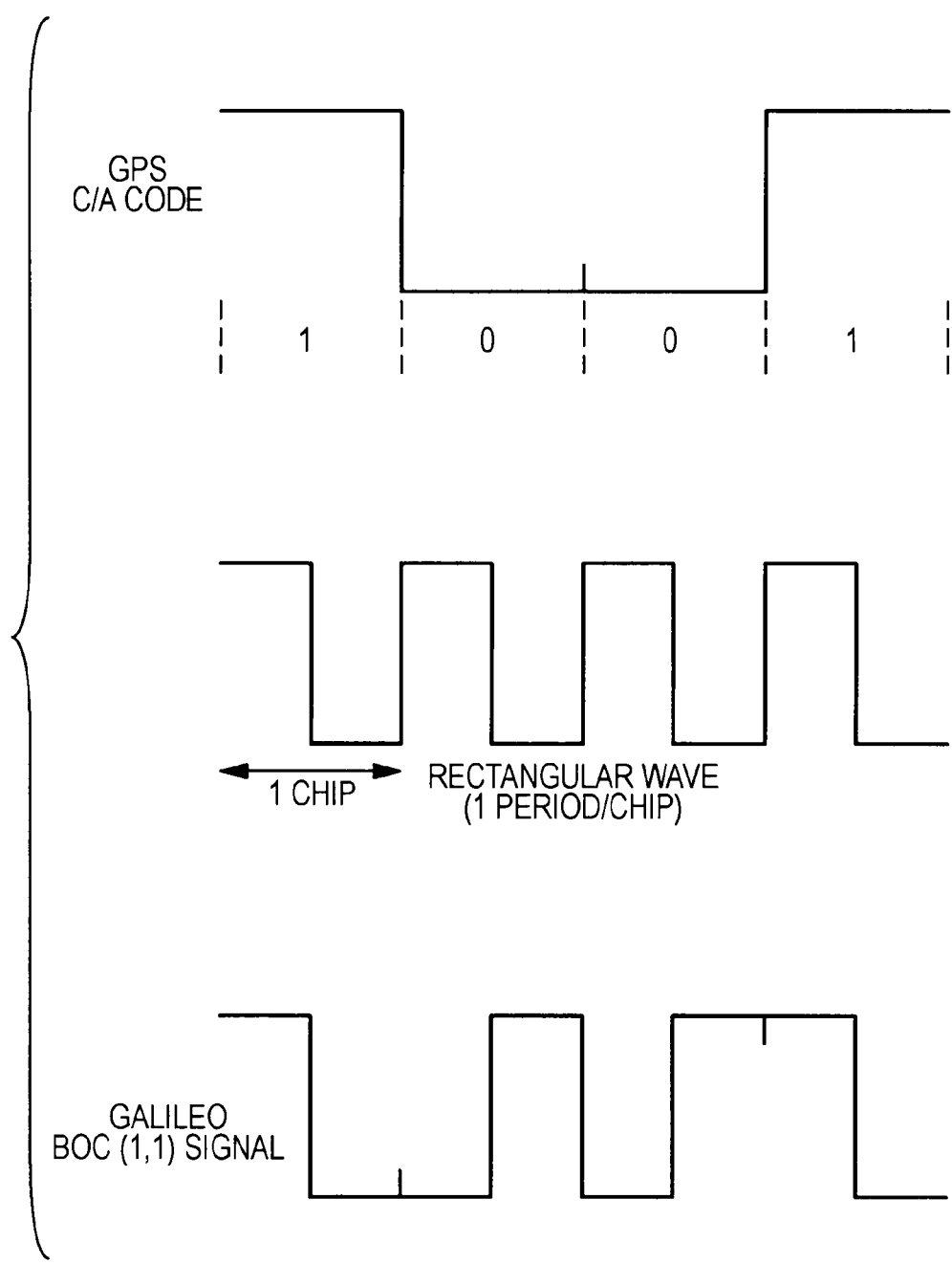
FIG. 17 is a diagram illustrating a GPS C/A code and a Galileo BOC (1,1) signal.
Figure 18:
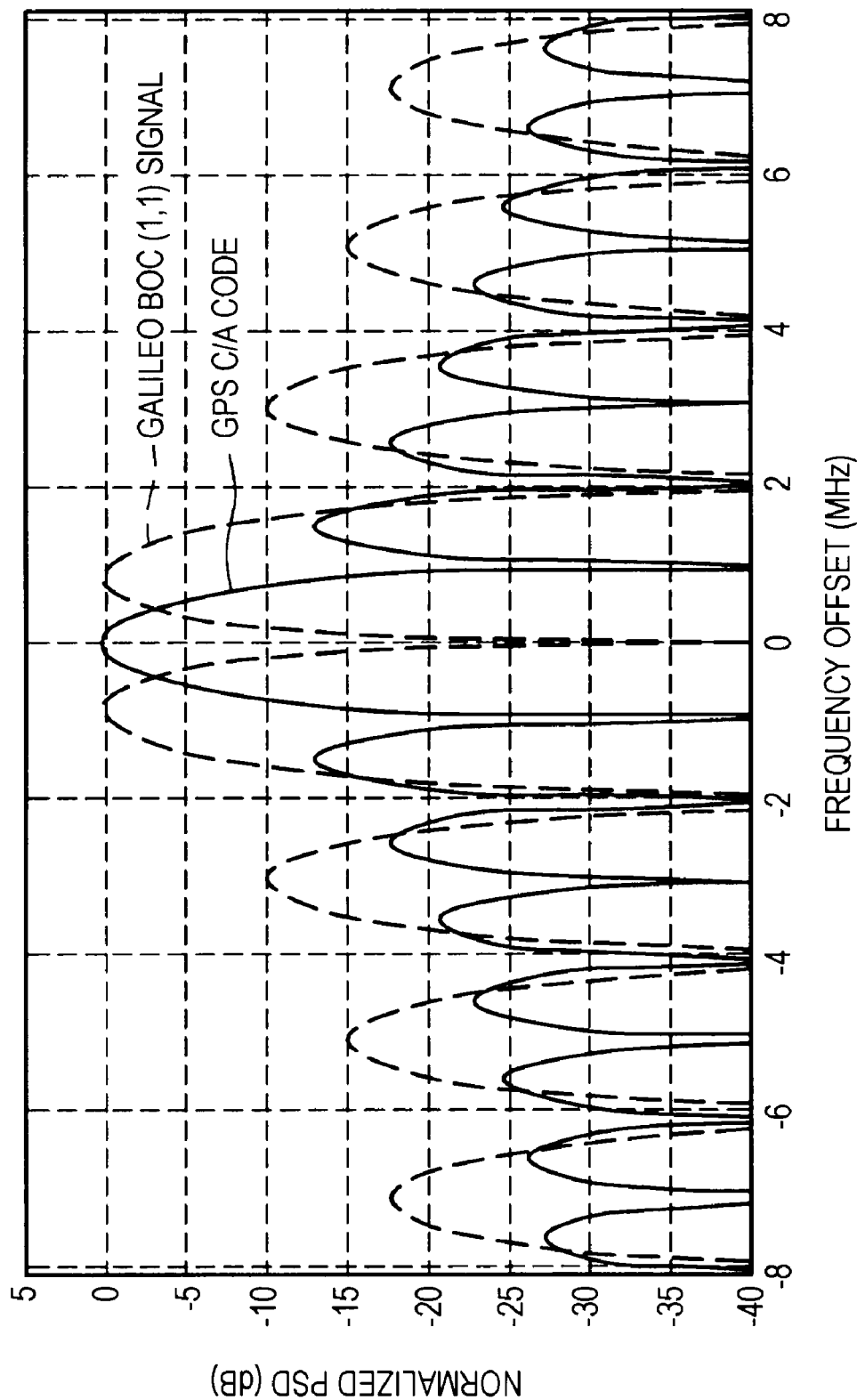
FIG. 18 is a graph illustrating one example of frequency characteristics of a GPS C/A code and a Galileo BOC (1,1) signal.

The above-described GPS module 160 is based on the reception of a signal from a GPS satellite. However, since the EU published a plan to operate a Galileo, which is an independent GNSS, from 2013, the GPS module 160 may also be based on the reception of a signal from the Galileo. The Galileo uses a common carrier frequency in an L1 band of the GPS. However, the GPS C/A code is different from the Galileo BOC (1,1) signal in terms of code type and spectrum as shown in FIGS. 17 and 18. However, as shown in FIG. 17, it is preferred that the BOC (1,1) signal has a length corresponding to the half of the chip length of the C/A code. Further, the 16 flip-flop circuits shown in FIG. 14 are reduced to 8 flip-flop circuits, so that the above-described GPS module can receive a signal from the Galileo. In addition, in FIG. 14, input to a subtractor may be changed from input from the $16^{th}$ flip-flop circuit to input from the $8^{th}$ flip-flop circuit. Moreover, since the above-described moving average filter has a small circuit size, it may be separately provided for the GPS satellite and the Galileo.

According to the above-described GPS module 160, the signal processors 200 and 300 limit the number of bits of the output signal by using the bit reducers 224 and 226 and 324 and 326, respectively. According to the embodiment of the invention, the bit reducers 224 and 226 and 324 and 326 are not necessarily provided. However, an increase in the number of bits of the output signal causes an increase in the calculation digit number and the memory size in the synchronization acquisition unit 40 and the synchronization holding unit 50, resulting in an increase in the circuit size. In the GPS module, the number of bits of the output signal from the ADC 36 in FIG. 1 is typically 1 bit or 2 bits. If the number of bits is 2 bits, it is considered that reduction of an S/N ratio does not practically cause any problems. If a signal of 2 bits is subject to 16 sample addition, 6 bits are obtained through an increase by 4 bits at maximum. When taking random characteristics of an input signal into consideration, in the case of four times ($\sqrt{16}=4$) or more, even if 4 bits are obtained through an increase by 2 bits due to amplitude limitation, the S/N ratio is slightly reduced in the synchronization acquisition and the synchronization holding. A multi-bit ADC may be used by taking noise resistance into consideration. However, for example, as shown in FIG. 10, after performing an anti-noise process, the number of bits can be limited to 4 to 6 bits as described above.

In the above-described signal processors 200 and 300, the moving average filter with a simple configuration is used as the LPF used in common based on the operation when the inverse spread is performed. However, the LPF may be replaced with LPFs in other formats. If a bandwidth is narrowed, as shown in the enlarged view of FIG. 5 illustrating the inverse spreading output, the lower edge of the triangular waveform becomes dull. However, since the S/N ratio is slightly improved, for example, reduction in the bandwidth may be realized by using an FIR filter with a high order. Further, when using an IIR filter, the circuit size can be reduced as compared with the case of using the FIR filter.

Up to now, for the spectrum spread signal reception module receiving a weak signal, which is a representative example of a GPS module, the method for reducing the circuit size by allowing one chip integrator to be used in common has been described. However, the method can be performed by software using a CPU and a DSP without using a circuit with a hardware configuration.

The present application contains subject matter related to that disclosed in Japanese Priority Patent Application JP 2009-164691 filed in the Japan Patent Office on Jul. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A receiver comprising:
    a receiving unit that receives a signal from a satellite;
    a frequency conversion-discretization unit that converts the signal received in the receiving unit into a first intermediate frequency signal, discretizes the first intermediate frequency signal with a predetermined sampling frequency, and converts the discretized first intermediate frequency signal into a plurality of second intermediate frequency signals of frequency bandwidths including 0 Hz;
    a filter unit that filters one of the plurality of second intermediate frequency signals, which is output from the frequency conversion-discretization unit, through a predetermined filter;
    a synchronization acquisition unit that acquires synchronization of a spreading code in the one of the plurality of second intermediate frequency signals filtered by the filter unit; and
    a synchronization holding unit that holds the synchronization of the spreading code, which is acquired by the synchronization acquisition unit.

2. The receiver according to claim 1, wherein the frequency conversion-discretization unit includes:
    a first frequency converting section that converts the signal received in the receiving unit into the first intermediate frequency signal;
    a discretizing section that discretizes the first intermediate frequency signal, which is frequency-converted by the first frequency converting unit, with the predetermined sampling frequency; and
    a second frequency converting section that converts the discretized signal, which is output from the discretizing section, into discretized signals serving as the second intermediate frequency signals of the frequency bandwidths including 0 Hz.

3. The receiver according to claim 1 or 2, wherein the synchronization acquisition unit acquires the synchronization of the spreading code by down-sampling the one of the plurality of second intermediate frequency signals, which is filtered by the filter unit, with a frequency lower than the predetermined sampling frequency, and the synchronization holding unit holds the synchronization of the spreading code, which is acquired by the synchronization acquisition unit, by down-sampling the one of the plurality of second intermediate frequency signals, which is filtered by the filter unit, with the frequency lower than the predetermined sampling frequency.

4. The receiver according to claim 1, wherein the synchronization acquisition unit and the synchronization holding unit down-sample the one of the plurality of second intermediate frequency signals by selectively using a multi-phase clock.

5. The receiver according to claim 1, further comprising:
    a reduction unit that reduces the number of bits of the one of the plurality of second intermediate frequency signals output from the filter unit.

6. The receiver according to claim 1, wherein the predetermined filter is a moving average filter that performs a moving average with respect to the one of the plurality of second intermediate frequency signals by one chip of the spreading code.

7. The receiver according to claim 1, wherein the predetermined filter is a FIR (Finite Impulse Response) filter or an IIR (Infinite Impulse Response) filter.

8. A signal processing method comprising:
    receiving a signal from a satellite;
    converting the received signal into a first intermediate frequency signal;
    discretizing the first intermediate frequency signal with a predetermined sampling frequency;
    converting the discretized first intermediate frequency signal into a plurality of second intermediate frequency signals of frequency bandwidths including 0 Hz;
    filtering one of the plurality of second intermediate frequency signals through a predetermined filter;
    acquiring synchronization of a spreading code in the filtered one of the plurality of second intermediate frequency signals; and
    holding the acquired synchronization of the spreading code.

9. The method according to claim 8, further comprising:
    reducing the number of bits of the filtered one of the plurality of second intermediate frequency signals.

10. A non-transitory computer-readable storage medium having stored therein a program that causes a computer to perform a method comprising:
    receiving a signal from a satellite;
    converting the received signal into a first intermediate frequency signal;
    discretizing the first intermediate frequency signal with a predetermined sampling frequency;
    converting the discretized first intermediate frequency signal into a plurality of second intermediate frequency signals of frequency bandwidths including 0 Hz;
    filtering one of the plurality of second intermediate frequency signals through a predetermined filter;
    acquiring synchronization of a spreading code in the filtered one of the plurality of second intermediate frequency signals; and
    holding the acquired synchronization of the spreading code.

11. The non-transitory computer-readable storage medium according to claim 9, wherein the method further comprises:
    reducing the number of bits of the filtered one of the plurality of second intermediate frequency signals.

* * * * *